UNITED STATES PATENT OFFICE.

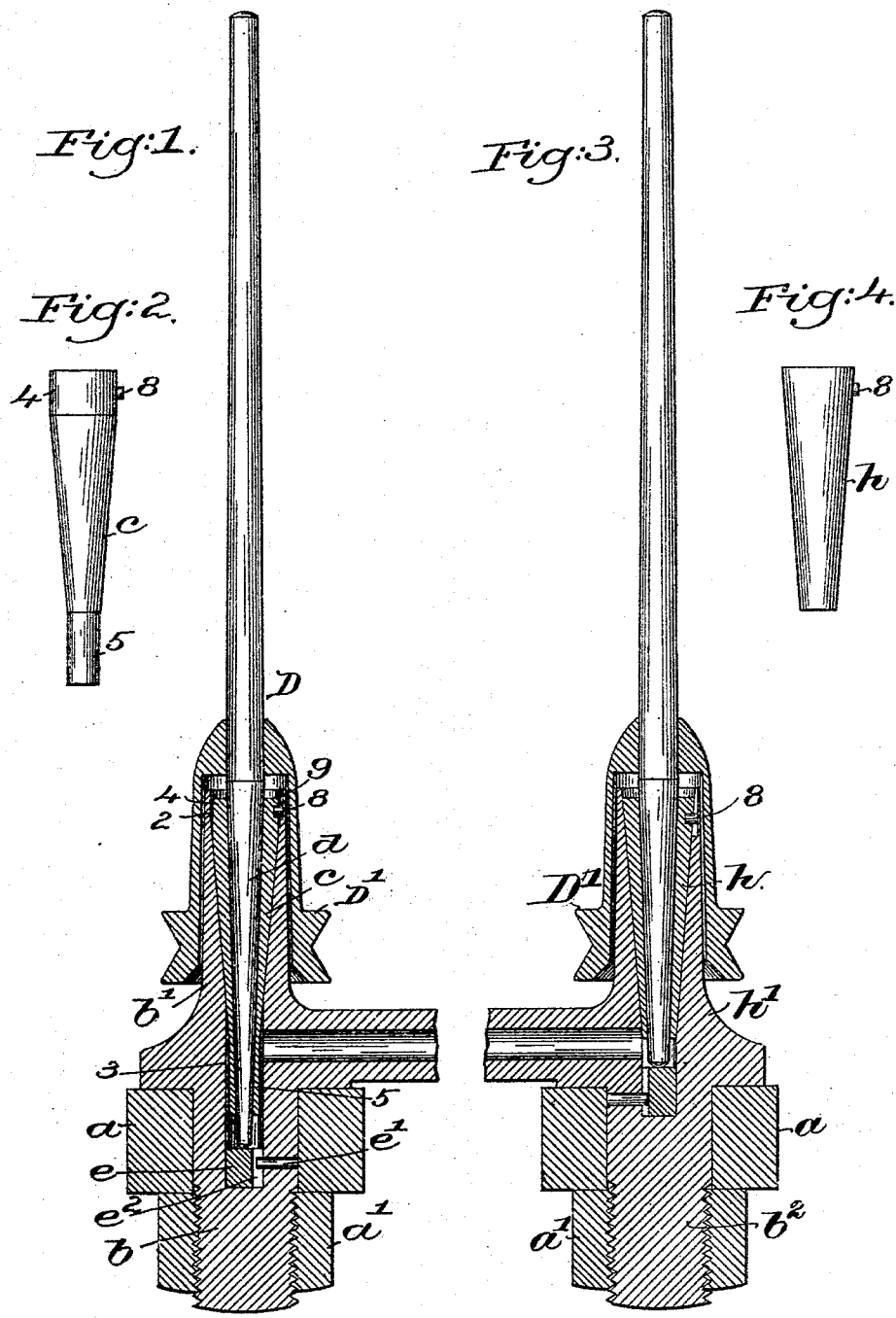

WILLIAM F. DRAPER, OF HOPEDALE, MASSACHUSETTS.

SPINDLE AND BEARING.

SPECIFICATION forming part of Letters Patent No. 515,732, dated February 27, 1894.

Application filed June 17, 1893. Serial No. 477,893. (No model.)

*To all whom it may concern:*

Be it known that I, WILLIAM F. DRAPER, of Hopedale, county of Worcester, State of Massachusetts, have invented an Improvement in Spindles and Bearings Therefor, of which the following description, in connection with the accompanying drawings, is a specification, like letters and figures on the drawings representing like parts.

A spindle when carrying a balanced load will run well when it has a loose fit in the surrounding lateral bearing, and the power consumed will be the minimum. Experiment also proves that so long as the load is balanced the lateral bearing need not have a loose fit in its surrounding supporting-case, but if the load is unbalanced then the lateral bearing should have a loose fit in the case, and the steadiness of running with an unbalanced load is further increased by making the fit between the pintle of the spindle and the interior of the bearing closer. I have devised a novel bearing in which the looseness of fit between the bearing and its surrounding case, as well as the closeness of the fit between the pintle of the spindle and the interior of the bearing may be automatically determined by or through the load carried by the spindle.

In my invention the bore in the lateral bearing as well as the exterior of the lateral bearing are tapered, the bore in the supporting-case being tapered to act as a seat for the tapered exterior of the bearing, while the tapered interior of the bearing co-operates with the tapered exterior of the pintle of the spindle.

Figure 1 in vertical section shows one of my improved bearings with a spindle in place. Fig. 2 shows the lateral bearing detached. Fig. 3 shows a view like Fig. 1 but of a modified form of my invention, and Fig. 4 shows the lateral bearing of Fig. 3 detached.

The rail $a$ receives the shank $b$ of the supporting or outer case seated thereon as usual and held in place by a suitable nut $a'$. The upright portion $b'$ of the case instead of having a bore substantially truly cylindrical, as heretofore, has a tapered bore, as clearly indicated in Figs. 1 and 3, and preferably the inner wall of the said case will have cylindrical portions or walls above and below the tapered walls, as indicated at 2, 3.

The lateral bearing $c$ has its inner wall tapered to fit the taper of the pintle $d$ of the spindle D having a sleeve whirl, and the exterior of said lateral bearing will be tapered to take seat in direction of gravity against the tapered inner wall of the case, but preferably the extremities of the lateral bearing externally will be substantially cylindrical, as shown at 4, 5, opposite the substantially cylindrical portions 2, 3, before referred to. The step $e$, having a substantially flat top, is separate from the lateral bearing, so that the lower end of the pintle sustained thereby may move laterally thereon as necessity requires, said step being restrained from rotation by some suitable device which may be a pin $e'$ entering a slot $e^2$ in the step. When the load on the spindle is balanced, the gyrations of the spindle is, it will be assumed, normal or not injurious to speed and good work, and at such time the lateral bearing takes a firm seat by its tapered exterior against the tapered interior portion of the case, and the said bearing is to all practical purposes rigid, yet the pintle of the spindle, under such conditions, rests by its extremity on the step, and the fit between the pintle and lateral bearing is that of its greatest looseness. Now if the load is unbalanced the gyrations of the extremity of the spindle impart a series of blows or lines of pressure within and against the interior of the lateral bearing which results in lifting the lateral bearing or working it up along over the tapered interior of the case, and at the same time the tapers at the interior of the bearing and at the exterior of the pintle are fitted closer and closer together, the combined result being to loosen the fit between the lateral bearing and the case and tighten the fit between the spindle and bearing.

The spindle and bearing will find a proper place vertically in which they may rotate steadily to care for the load then on the spindle and the speed of the spindle.

I have added the cylindrical or straight extensions 4, 5, their purpose being to limit the extent of lateral play of the spindle and bearing when the latter is unseated from the case.

I prefer that the taper at the exterior of the bearing be more oblique than at the interior, so that when the spindle rises by gyration there may be greater looseness between the bearing and case, than between the pintle and bearing.

The rotation of the bearing in the case may be restrained in any usual manner, as by a pin 8 and slot 9.

The bearing will and may have suitable passages for oil to be supplied from any usual source.

Referring now to the modification Figs. 3 and 4, the parts therein shown differ from those shown in Figs. 1 and 2 and fully described, only that the straight portions at the ends of the lateral bearing $h$ and at the interior of the supporting case $h'$ at its upper end are omitted.

Having described my invention, what I claim, and desire to secure by Letters Patent, is—

1. A spindle having a tapered pintle; a whirl attached to said spindle and surrounding said pintle; and a supporting case having a tapered interior; combined with a lateral bearing interposed between said pintle and said supporting case and within said whirl, said lateral bearing tapered externally to rest against the tapered surface of the interior of said supporting case, and tapered internally to fit the taper of the spindle, and an independent step, to operate, all as shown and described.

2. A supporting-case having a tapered interior, and a spindle having a tapered pintle, combined with an interposed lateral bearing tapered externally to rest against and be supported vertically by the said case, and tapered at its interior to receive and fit the taper of the pintle, said bearing having a substantially straight extension to limit the extent of the lateral movement of the bearing, substantially as described.

In testimony whereof I have signed my name to this specification in the presence of two subscribing witnesses.

WILLIAM F. DRAPER.

Witnesses:
C. E. LONGFELLOW,
S. F. SMITH.